US 6,595,453 B2

(12) United States Patent
Dürrstein et al.

(10) Patent No.: US 6,595,453 B2
(45) Date of Patent: Jul. 22, 2003

(54) METHOD OF CONTROLLING THE TORQUE DEVELOPED AT A BELT SHAFT OF A BELT RETRACTOR COUPLED TO AN ELECTRIC MOTOR

(75) Inventors: Rolf Dürrstein, Bietigheim (DE); Cornelius Peter, Bühl (DE)

(73) Assignee: TRW Automotive Electronics & Components GmbH & Co. KG, Radolfzell (DE)

(*) Notice: Subject to any disclaimer, the term of this patent is extended or adjusted under 35 U.S.C. 154(b) by 0 days.

(21) Appl. No.: 09/863,480

(22) Filed: May 23, 2001

(65) Prior Publication Data

US 2002/0011537 A1 Jan. 31, 2002

(30) Foreign Application Priority Data

May 24, 2000 (DE) .......................... 100 25 611

(51) Int. Cl.[7] .............................................. B60R 22/34
(52) U.S. Cl. ................................... 242/390.9; 280/807
(58) Field of Search .......................... 242/390.8, 390.9; 280/807

(56) References Cited

U.S. PATENT DOCUMENTS 5,775,618 A * 7/1998 Krambeck .................. 242/372
6,328,242 B1 * 12/2001 Specht ..................... 242/375.1

FOREIGN PATENT DOCUMENTS

| DE | 2220669 | | 11/1973 |
| DE | 2742676 | A | 4/1979 |
| DE | 3019298 | A | 11/1981 |
| DE | 6901352 | T2 | 5/1995 |
| DE | 19636448 | A1 | 4/1997 |
| DE | 19731689 | C2 | 7/1999 |

* cited by examiner

Primary Examiner—John Q. Nguyen
(74) Attorney, Agent, or Firm—Tarolli, Sundheim, Covell & Tummino L.L.P.

(57) ABSTRACT

The torque developed at a belt shaft of a belt retractor coupled to an electric motor via a drive belt is controlled so as to avoid a hysteresis. For this purpose, the direction of rotation of the belt shaft is detected and, depending on the direction of rotation as detected, the electric current supplied to the electric motor is changed from a first value to a second value that is different from the first value by an amount required to compensate for hysteresis.

11 Claims, 2 Drawing Sheets

METHOD OF CONTROLLING THE TORQUE DEVELOPED AT A BELT SHAFT OF A BELT RETRACTOR COUPLED TO AN ELECTRIC MOTOR

FIELD OF THE INVENTION

The invention relates to a method of controlling the torque developed at a belt shaft of a belt retractor coupled to an electric motor. DE 100 18 972 discloses a belt retractor whose belt shaft is driven by an electric motor rather than by a coil spring. The electric motor is coupled to the belt shaft by a toothed belt. Assuming the electric motor to be supplied with a constant amount of current, friction and the flexing work of the toothed belt result in a hysteresis of the seat belt forces, being different when the seat belt is wound up and when it is unwound.

BRIEF SUMMARY OF THE INVENTION

It is an object of the invention to essentially avoid hysteresis forces in order to keep the pressure exerted by the seat belt on the body of the vehicle occupant essentially constant.

In the method according to the invention, torque developed at a belt shaft of a belt retractor coupled to an electric motor is controlled by detecting a direction of rotation of the belt shaft and, depending on the direction of rotation as detected, changing electric current supplied to the electric motor from a first value to a second value that is different from the first value by an amount required to compensate for hysteresis.

Accordingly, to equalize the seat belt forces the amount of electric current supplied to the electric motor is adjusted in such a way that it is increased in the winding direction and decreased in the unwinding direction, resulting in substantially equal torque at the belt shaft and hence essentially equal seat belt forces when the seat belt is wound up and unwound.

In accordance with a preferred embodiment of the invention, a standstill of the belt shaft is also detected. The seat belt forces needed to keep the pull-out length of the seat belt constant are smaller than the forces needed to unwind it. Accordingly, to compensate for the smaller forces, a higher amount of electric current is supplied to the electric motor.

In case of an emergency, when strong deceleration forces act on the vehicle, inertia forces tend to move the body of the vehicle occupant away from the seat, entraining and unwinding thereby the seat belt at a speed that is higher than during normal movement of the vehicle occupant. In order to protect the vehicle occupant, such a rapid unwinding of the seat belt has to be avoided.

In accordance with another preferred embodiment of the invention, rotational speed of the belt shaft is measured in an unwinding direction and when a predetermined first threshold value of rotational speed is exceeded, the resistance against pulling out the seat belt is increased by increasing the amount of electric current supplied to the electric motor, the rate of increase being constant. Only when a second threshold value of rotational speed, corresponding to a threshold value of the amount of electric current, is reached, a mechanical locking mechanism on the belt retractor is activated. Otherwise a restriction of the seat belt is achieved by means of the electric motor only.

A preferred use of the inventive method is in a retractor of the type comprising a frame, a belt shaft rotatably fixed in the frame and an electric motor coupled to the belt shaft by a drive belt, wherein the direction of rotation can be detected and, depending on the direction of rotation as detected, the motor current is adjusted.

BRIEF DESCRIPTION OF THE DRAWINGS

The invention will now be explained in greater detail with reference to the appended drawings.

DETAILED DESCRIPTION OF THE INVENTION

Figure 1:
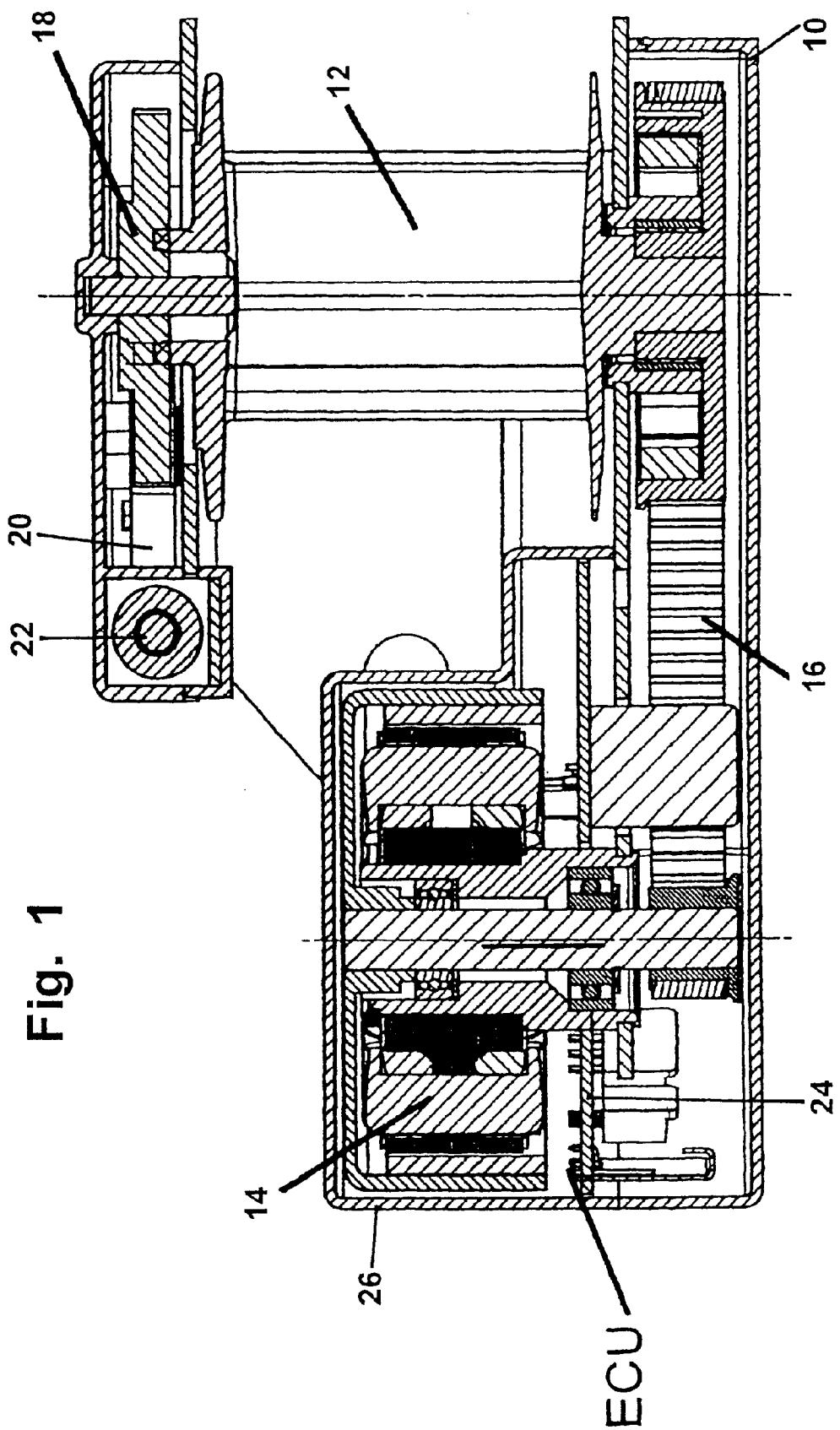
FIG. 1 is a cross-sectional view of a belt retractor.

FIG. 1 shows a cross-sectional view of a belt retractor wherein the method according to the invention is used.

The belt retractor comprises a frame 10, a belt shaft 12 rotatably mounted in the frame 10 for taking up a seat belt and a brushless electric motor 14 coupled to the belt shaft 12 by a drive belt 16. A mechanical locking mechanism is associated with the belt shaft 12 on the side opposite to the drive belt 16. The locking mechanism includes a ratchet 18, a pawl 20 and an electromagnet 22. In case of emergency the pawl 20 is controllably made to engage an external toothing on the ratchet wheel 18 locking thereby the belt shaft 12.

The belt retractor further comprises a printed circuit board 24 accommodated in the housing 26 of the electric motor 14. An electronic microcontroller including a read-only memory and commutation control Hall sensors are mounted on the printed circuit board 24.

A belt retractor as described above, when the electric motor 14 is operated in a constant current mode, generates a constant torque that activates the belt shaft 12 through the drive belt 16. Since, when the seat belt is wound up or unwound, friction and flexing work of the drive belt 16 give rise to different seat belt forces depending on the direction of motion, hysteresis effects are present in such an operational mode.

Figure 2:
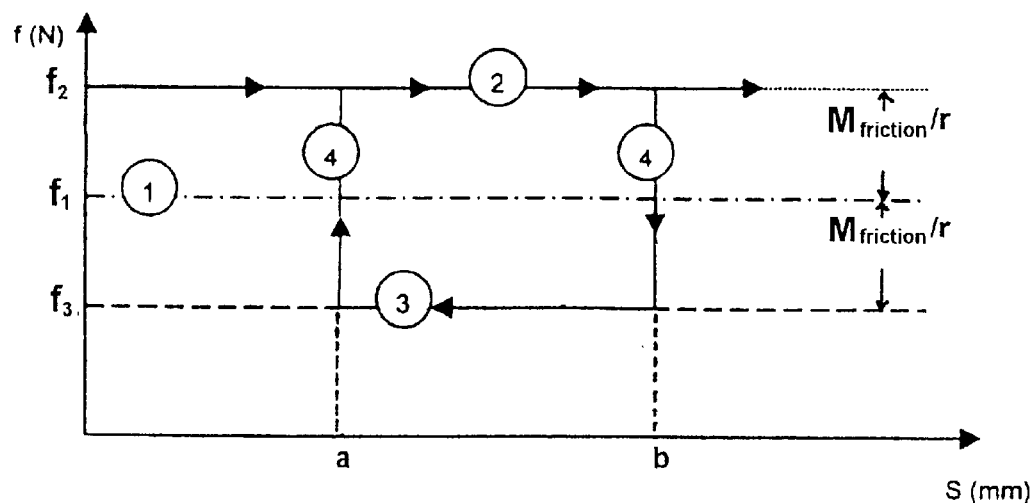
FIG. 2 is a diagram that illustrates the different forces during the winding and the unwinding of the seat belt giving rise to a hysteresis.

The situation is shown in FIG. 2 where the seat belt forces f are plotted as a function of the pulled-out seat belt length S in dependence upon the seat belt being either unwound or wound, and is explained in more detail with reference to the numerals therein which stand for the following:

①—A force $f_1$ is an ideal seat belt unwinding/winding force in a sense that no hysteresis occurs, i.e. the seat belt force $f_1$ is independent of the direction of motion of the seat belt. Denoting with $M_{motor}$ the driving moment of the electric motor 14, with $M_{drivebelt}$ the moment transferred to the belt shaft 12 by the drive belt 16, with $M_{friction}$ the moment caused by friction and flexing work with f the force in the seat belt and with r the lever arm of force of the seat belt force f giving rise to $M_{drivebelt}$, the difference between a force $f_2$ and a force $f_3$ (to be explained below) is $2M_{friction}/r$ and $f_1=(f_2+f_3)/2$ as shown in FIG. 2.

② and ③—Keeping the motor current constant, the seat belt force $f_2$ on unwinding of the seat belt is larger than seat belt force $f_3$ on winding up.

④—Hysteresis forces. When, after having been pulled out a distance S=b with force $f_2$, the seat belt is about to be wound, the seat belt force drops to the smaller value $f_3$. When, on the other hand, after having been wound a distance S=b−a with force $f_3$, the seat belt is about to be unwound, the force needed jumps to the larger value $f_2$.

Also, after the seat belt has been pulled out a particular distance with force $f_2$ and is kept in that position, the retention force is smaller than $f_2$.

The solution proposed according to the invention to essentially avoid the hysteresis effects as described above comprises substantially the following two steps:

a) Detection of the direction of rotation of the belt shaft 12.

Using the commutation control Hall sensors, the direction of rotation of the belt shaft 12 is detected. In addition, a standstill of the seat belt on the seat belt retractor is recognized when the last Hall edge change has been stable for more than about one second. Depending on the direction of rotation, the amount of current supplied to the electric motor 14 is set as follows:

b) Setting the value of the motor current to avoid hysteresis effects.

In order to provide the torque needed to compensate for hysteresis effects inherent in the drive belt 16, the motor current has to be adjusted. According to the invention, this is accomplished by means of pulse width modulation (PWD). The values of a first motor current $I_2$ and a second motor current $I_3$, corresponding to equal belt forces on winding and unwinding, are determined experimentally.

If a seat belt unwinding motion is detected, the first, lower motor current $I_2$ is set by adjusting the duty cycle of the pulse width modulation. The current $I_2$ set in such a way corresponds to the desired seat belt unwinding force.

If, on the other hand, a seat belt retraction motion is detected, then the duty cycle of the PWM is increased to a value that corresponds to the second, higher motor current $I_3$. The values $I_2$ and $I_3$ are set in such a way that the hysteresis forces that occur at points a and b in FIG. 2 are largely compensated for.

The motor current is likewise set to a higher value when a seat belt standstill is detected.

According to a further embodiment of the invention, a set of values $(I_2, I_3)_i$, each for a different temperature $T_i$, can be stored in the memory of the microcontoller, taking into account the temperature dependence of flexing and friction forces. The temperature information needed by the microcontroller to select the correct set of values $(I_2, I_3)$ to substantially eliminate hysteresis effects can either be measured locally with an integrated NTC thermistor or it is queried via a CAN Bus interface.

Figure 3:
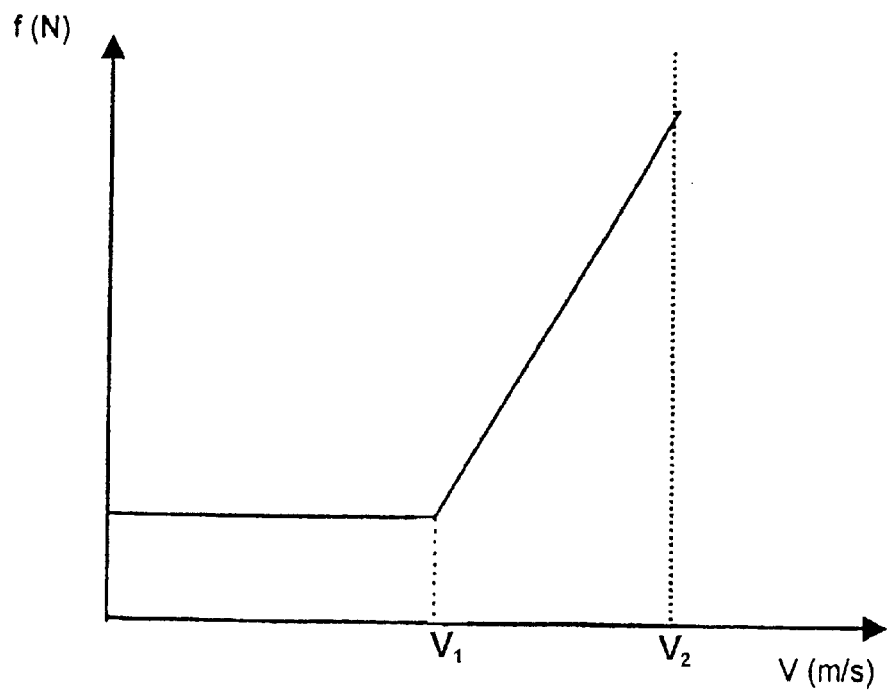
FIG. 3 is a diagram that shows the seat belt force as a function of the unwinding velocity.

According to a further embodiment of the invention, the rotational speed of the belt shaft 12 on unwinding is measured and the amount of electric current supplied to the electric motor 14 is increased when a predetermined first threshold value $V_1$ of rotational speed is exceeded, as shown in FIG. 3. The motor current I is increased as a function of the belt unwinding velocity V. Only when a second threshold value $V_2$ of rotational speed is reached, the mechanical lokking mechanism on the belt retractor is activated.

To put it differently, no restriction of the seat bealt is initiated with a rotational unwinding speed of the belt shaft 12 that is smaller than $V_1$. The restriction is carried out using only the electric motor 14 when the measured value of the rotational speed lies between $V_1$ and $V_2$. With the rotational speed being above $V_2$, the mechanical locking mechanism is actuated.

What is claimed is:

1. A method of controlling torque developed at a belt shaft of a belt retractor coupled to an electric motor, the method comprising the steps of:

detecting a direction of rotation of said belt shaft; and changing electric current supplied to said electric motor depending on said direction of rotation as detected, from a first value to a second value that is different from the first value by an amount resulting in substantially equal torque at said belt shaft on winding and unwinding of said seat belt to compensate for hysteresis forces.

2. The method according to claim 1, wherein, when said belt shaft is rotated in a winding direction, a higher amount of electric current is supplied than when it is rotated in an unwinding direction.

3. The method according to claim 2, wherein a standstill of said belt shaft is detected and a higher amount of electric current is supplied when said belt shaft is at a standstill.

4. The method according to claim 1, wherein amounts of electric current supplied to said electric motor are corrected to compensate for changes in ambient temperature.

5. The method according to claim 4, wherein temperature-dependent amounts of electric current are retrieved from a read-only memory (ROM).

6. The method according to claim 1, wherein rotational speed of said belt shaft is detected in an unwinding direction and the amount of electric current supplied to said electric motor is increased when a predetermined threshold value of rotational speed is exceeded.

7. The method according to claim 6, wherein the amount of electric current supplied to said electric motor is increased as rotational speed of said belt shaft increases.

8. The method according to claim 7, wherein a mechanical locking mechanism on said belt retractor is activated when a predetermined threshold value of current supplied to said electric motor is reached.

9. The method according to claim 1, wherein said electric motor is coupled to the belt shaft by a reduction gear comprising a drive belt.

10. The method according to claim 1, wherein rotation of said belt shaft is indirectly detected by means of Hall sensors associated with said electric motor.

11. The method according to claim 1, wherein electric current supplied to said electric motor is modulated by pulse width modulation.

* * * * *